United States Patent
Yamauchi

[19]

[11] Patent Number: 6,122,338
[45] Date of Patent: Sep. 19, 2000

[54] AUDIO ENCODING TRANSMISSION SYSTEM

[75] Inventor: Ken'ichi Yamauchi, Hamamatsu, Japan

[73] Assignee: Yamaha Corporation, Hamamatsu, Japan

[21] Appl. No.: 08/936,124

[22] Filed: Sep. 24, 1997

[30] Foreign Application Priority Data

Sep. 26, 1996 [JP] Japan .................................. 8-254967

[51] Int. Cl.$^7$ .................................................. H04L 23/00
[52] U.S. Cl. ..................... 375/377; 370/521; 704/500; 381/2
[58] Field of Search ..................... 375/377, 242, 375/259, 285; 370/521, 527, 529, 326; 704/200, 212, 500, 501; 381/2

[56] References Cited

U.S. PATENT DOCUMENTS

| | | | |
|---|---|---|---|
| 4,071,707 | 1/1978 | Graf et al. | 375/377 |
| 5,285,498 | 2/1994 | Johnston | 381/2 |
| 5,341,457 | 8/1994 | Hall, II et al. | 395/2.35 |
| 5,394,473 | 2/1995 | Davidson | 381/36 |
| 5,535,300 | 7/1996 | Hall, II et al. | 395/2.36 |
| 5,559,900 | 9/1996 | Jayant et al. | 382/248 |
| 5,596,602 | 1/1997 | Couwenhoven et al. | 375/240 |
| 5,636,324 | 6/1997 | Teh et al. | 315/2.35 |
| 5,768,537 | 6/1998 | Butter et al. | 395/200.77 |
| 5,850,418 | 12/1998 | Van De Kerkof | 375/240 |
| 5,896,358 | 4/1999 | Endoh et al. | 369/89 |
| 5,901,191 | 5/1999 | Ohno | 375/377 |
| 5,930,312 | 7/1999 | Marum | 375/377 |
| 5,956,674 | 9/1999 | Smyth et al. | 704/229 |

*Primary Examiner*—Chi H. Pham
*Assistant Examiner*—Bryan Webster
*Attorney, Agent, or Firm*—Pillsbury Madison & Sutro LLP

[57] ABSTRACT

An audio encoding transmission system is provided for a transmitting station which performs data transmission with respect to a receiving station through a network. The transmitting station contains a scalable encoder which performs an encoding process on audio signals input thereto in response to bit rate information representing a bit rate which is variable in response to a condition of the network. Results of the encoding process are partitioned into outline data, having a low bit rate, and detail data. Herein, the outline data correspond to low-frequency components of the audio signals while the detail data correspond to high-frequency components of the audio signals, for example. A bit stream is constructed using the outline data and detail data as well as additional information such as a header and a boundary identifier which are created on the basis of the audio signals and bit rate information. Thus, the transmitting station transmits the bit stream to the receiving station via the network. Herein, the transmitting station firstly performs real-time transmission of the outline data with a low bit rate. So, the receiving station performs successive decoding of the outline data to provide successive reproduction of the audio signals. This provides a chance for a listener to give a brief audition to the audio signals substantially without a wait time. Thereafter, the transmitting station transmits the detail data to the receiving station. Thus, the receiving station is capable of performing decoding of the outline data and detail data to provide high-quality reproduction of the audio signals.

16 Claims, 9 Drawing Sheets

AUDIO ENCODING TRANSMISSION SYSTEM

BACKGROUND OF THE INVENTION

1. Field of the Invention

This invention relates to audio encoding transmission systems which transmit audio signals in an encoded form onto communication lines.

2. Prior Art

There are provided a variety of systems that are designed to transmit audio information onto communication lines in an encoded form. According to the conventional technology of the system, reproduction of the audio information cannot be carried out until transmission completes with respect to all pieces of audio information. For this reason, in order to perform reproduction of the audio information which are transmitted in a real-time manner, it is important to select an optimum bit rate of transmission in consideration of frequency bands of communications. In other words, it is important to select an optimum compression rate of coding. When it is demanded to provide a certain degree of sound quality in reproduction of the audio information, for example, it is not possible to raise the compression rate of coding so much. So, the system requires a wait time to wait for completion of the transmission of all pieces of the audio information. To cope with a demand that a user (i.e., a human operator) gives a brief audition to the reproduced audio information for a short period of time, the compression rate of coding is raised to lower the sound quality in reproduction of the audio information.

To meet the above demand, the conventional technology proposes an audio encoding system which is a scalable system that is capable of selecting a certain reproduction quality for decoding as well as a certain compression rate of coding. For example, the technology of the above system is disclosed by the paper entitled "Encoding system, for musical sound and voice, having scalable hierarchical structure", provided by the Japanese people of the names of Mr. Akio Kami and Mr. Satoshi Miki, which is written on pp277–278 of the lecture paper collection, denoted by numerals of "H7.9 Auido B3-1-5", of the Japanese Acoustics Society. This system uses an encoding method (or coding method) using three levels of hierarchy. Herein, a first level of hierarchy encodes narrow-band signals which are obtained by performing down-sampling of input signals. In higher levels of hierarchy, a difference is detected between an input signal, whose band is broadened as compared with a lower level of hierarchy, and reproduced sound; then, encoding is performed on the difference. By the way, a low bit rate is employed when frequency bands of communications (referred to as communication bands) do not have a sufficient room for communications. In contrast, a high bit rate is employed when the communication bands have a sufficient room for communications. The above encoding system employing the hierarchical structure is characterized by changing over pieces of information belonging to the levels of hierarchy. That is, in case of the low bit rate, the system uses only the information of a low level of hierarch to enable encoding at a low quality. In case of the high bit rate, the system uses information of a high level of hierarchy as well, so it is possible to reproduce sound of a broad band with a high quality.

According to the conventional audio encoding transmission system described above, it may be possible to give a brief audition to the audio information at a receiving station (corresponding to a decoding system) for a short period of time. However, to enable transmission of the audio information with a higher quality, it is necessary to start re-transmission of bit streams from their first portions at a high bit rate. Therefore, the conventional system suffers from a problem that a wait time in reproduction should become longer because of the re-transmission of the bit streams at a high bit rate.

SUMMARY OF THE INVENTION

It is an object of the invention to provide an audio encoding transmission system which is capable of encoding audio information and transmitting it onto a communication line in such a way that the audio information can be reproduced with a desired reproduction quality.

It is another object of the invention to provide an audio encoding transmission system which is capable of encoding audio information and transmitting it onto a low-speed communication line in such a way that the audio information can be reproduced at a high reproduction quality and with requiring a relatively small amount of wait time.

The above objects of the invention can be expressed in a more concrete manner as follows:

Even if the communication line is poor and low speed, the audio encoding transmission system of this invention is capable of providing transmission of audio information in an encoded manner in such a way that a user can give a brief audition to the audio information at a receiving station substantially without a wait time. As a result of the audition, if the user wishes to listen to the same audio information at a high quality, the system of this invention is capable of providing the audio information in such a way that the user can listen to the audio information with a high quality and with requiring a relatively small amount of wait time.

An audio encoding transmission system of this invention is provided for a transmitting station which performs data transmission with respect to a receiving station through a network. The transmitting station contains a scalable encoder which performs an encoding process on audio signals input thereto in response to bit rate information representing a bit rate which is variable in response to a condition of the network. Results of the encoding process are partitioned into outline data, having a low bit rate, and detail data. Herein, the outline data correspond to low-frequency components of the audio signals while the detail data correspond to high-frequency components of the audio signals, for example. A bit stream is constructed using the outline data and detail data as well as additional information such as a header and a boundary identifier which are created on the basis of the audio signals and bit rate information. Thus, the transmitting station transmits the bit stream to the receiving station via the network. Herein, the transmitting station firstly performs real-time transmission of the outline data with a low bit rate. So, the receiving station performs successive decoding of the outline data to provide successive reproduction of the audio signals. This provides a chance for a listener to give a brief audition to the audio signals substantially without a wait time. Thereafter, the transmitting station transmits the detail data to the receiving station. Thus, the receiving station is capable of performing decoding of the outline data and detail data to provide high-quality reproduction of the audio signals.

This invention can be realized using the Internet whose communication bands may change momentarily. Because, this invention is capable of adjusting the bit rate of the outline data in response to the condition of the network.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
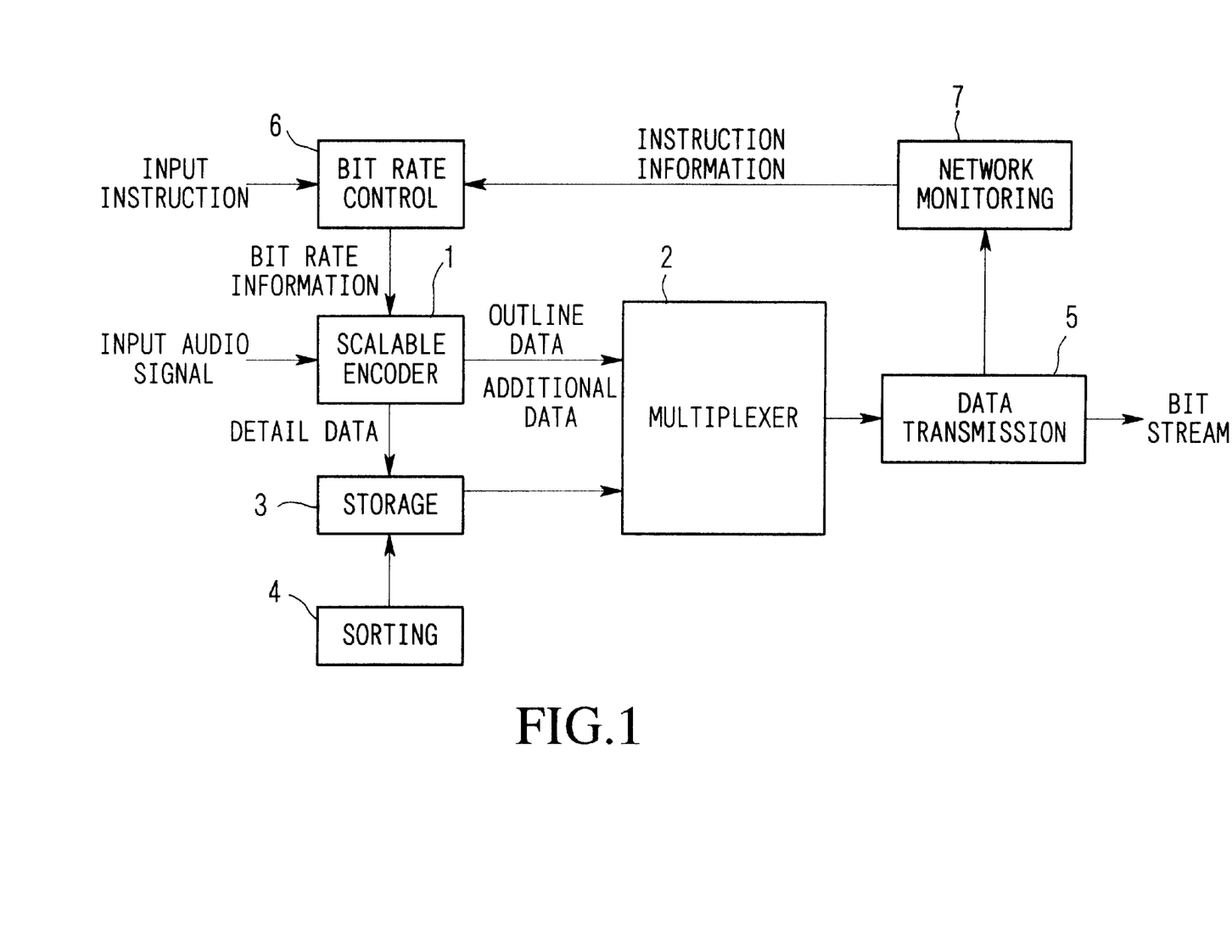
FIG. 1 is a block diagram showing an example of a configuration of a transmitting station which corresponds to an audio encoding transmission system in accordance with an embodiment of the invention.

FIG. 1 is a block diagram showing an example of a configuration of a transmitting station which is designed in accordance with an embodiment of the invention. Incidentally, it is possible to provide first and second methods for the operation of the transmitting station. According to the first method, the transmitting station firstly performs transmission of outline data at a fixed bit rate, regardless of conditions of the network (i.e., conditions of communication lines). According to the second method, the transmitting station adjusts a bit rate for outline data in response to conditions of the network. For this reason, a description will be given with respect to the configuration of the transmitting station which meets each of the above methods respectively. Incidentally, as the network, it is possible to employ the "Internet" whose communication bands may change momentarily.

(1) First Method that Outline Data have a Fixed Bit Rate

Input audio signals are input to a scalable encoder 1 wherein they are subjected to encoding process based on a predetermined encoding method. Then, data of the audio signals are divided into outline data and detail data. Herein, the outline data have a fixed bit rate based on bit rate information which is designated in advance, whilst the detail data complement the outline data to enable high-quality reproduction of the audio signals. The outline data together with additional information such as a header and a boundary identifier are supplied to a multiplexer 2. The detail data are once stored in a storage unit 3. Then, the detail data are read from the storage unit 3 under a control of a sorting section 4 and are supplied to the multiplexer 2. The multiplexer 2 sequentially outputs input data thereof in form of a bit stream, wherein elements of data are arranged in an order of the header, outline data, boundary identifier and detail data. Those elements of data are sequentially supplied to a data transmitting section 5. The data transmitting section 5 transmits the bit stream, supplied thereto from the multiplexer 2, to a receiving station via the transmission line (or communication line). A bit rate control section 6 determines a bit rate for the outline data in accordance with an instruction input thereto. So, the bit rate control section 6 produces bit rate information, which is supplied to the scalable encoder 1. Incidentally, the transmitting station makes the setting such that the bit rate corresponds to an appropriate amount of transmitting information which can be transmitted in a real-time manner even if the network used for transmission is low speed.

Figure 2A:
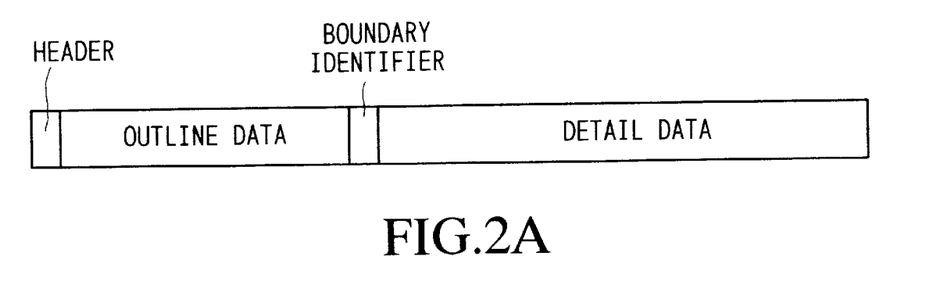
FIGS. 2A and 2B show formats of bit streams which are formed by the transmitting station.

FIG. 2A shows an example of a format of a bit stream which is constructed by the multiplexer 2 of the transmitting station. Herein, the bit stream consists of the header, outline data, boundary identifier and detail data, which are assembled in order.

(2) Second Method that Outline Data have Variable Bit Rates

A network monitoring section 7 normally monitors conditions of the network by means of the data transmitting section 5. If a change occurs in communication bands, the network monitoring section 7 supplies instruction information to the bit rate control section 6. The instruction information instructs the bit rate control section 6 to adjust a bit rate of the outline data. There are provided a variety of methods to adjust the bit rate. For example, the system reduces a number of bits for coding; or the system thins out parts of data for transmission. As shown in the configuration of the bit stream, the outline data pair with the detail data. So, the bit rate of the detail data is determined to absorb the bit rate of the outline data.

Figure 2B:
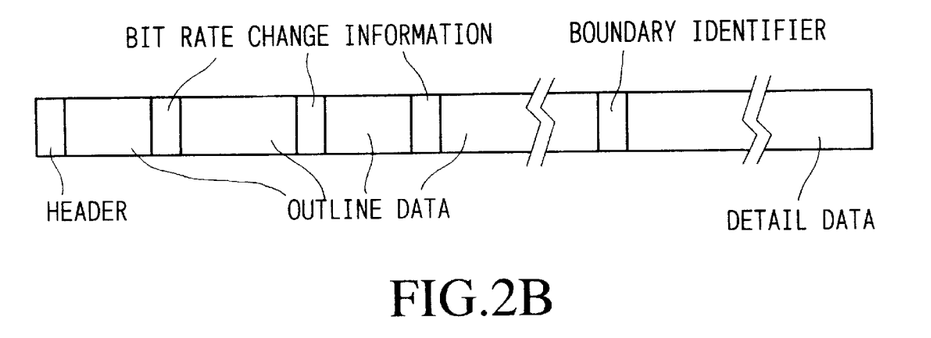

In the case where the bit rate is variable, the bit stream which is constructed by the multiplexer 2 has a format show in FIG. 2B. Herein, information representing a change of the bit rate (simply referred to as bit rate change information) is inserted into the outline data following the header just before a change occurs on the bit rate. Using such outline data containing the bit rate change information, the receiving station is capable of recognizing a latest bit rate of the outline data.

Figure 3A:
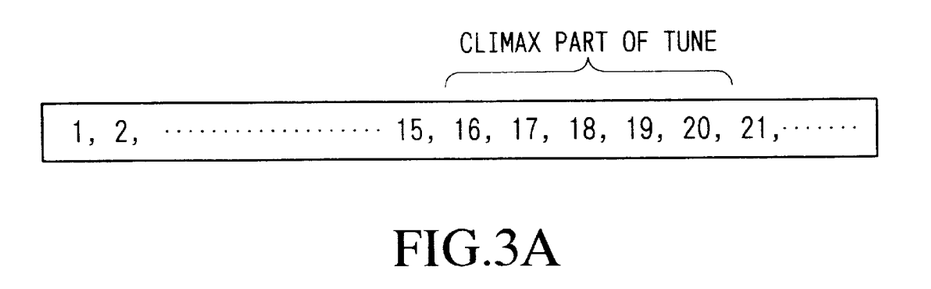
FIGS. 3A and 3B show examples of arrangement of musical tone data which are used to explain sorting performed by the transmitting station.
Figure 3B:
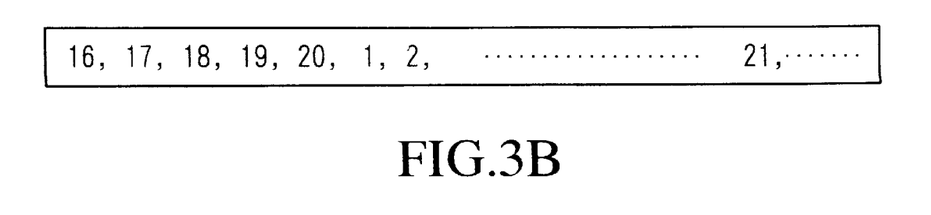

The detail data are divided into multiple portions which are subjected to sorting. For example, the portions of the detail data can be sorted based on degrees of importance such that a portion having a higher degree of importance comes first rather than a portion having a lower degree of importance. Or, the portions of the detail data are sorted such that a portion corresponding to a higher degree of importance in a tune is transmitted earlier than a portion having a lower degree of importance. FIG. 3A shows a format of arrangement of musical tone data each denoted by a number such as 1, 2, . . . Herein, numbers 16 to 20 designate musical tone data which correspond to the climax (or most important part) of the tune. A human creator who creates the musical tone data wishes a listener to listen to the above part of the tune with a high sound quality. So, the musical tone data of the above "climax" part of the tune are arranged at top positions of the detail data as shown in FIG. 3B. Thus, the data of the climax part of the tune are transmitted first. For this reason, even if the receiving station suddenly stops download of data during transmission of the detail data, it is possible for the listener to listen to reproduced sounds of the tune with a high quality with respect to the climax part of the tune which the human creator strongly wishes the listener to listen carefully. The above sorting of the detail data is carried out by the sorting section 4.

Figure 4:
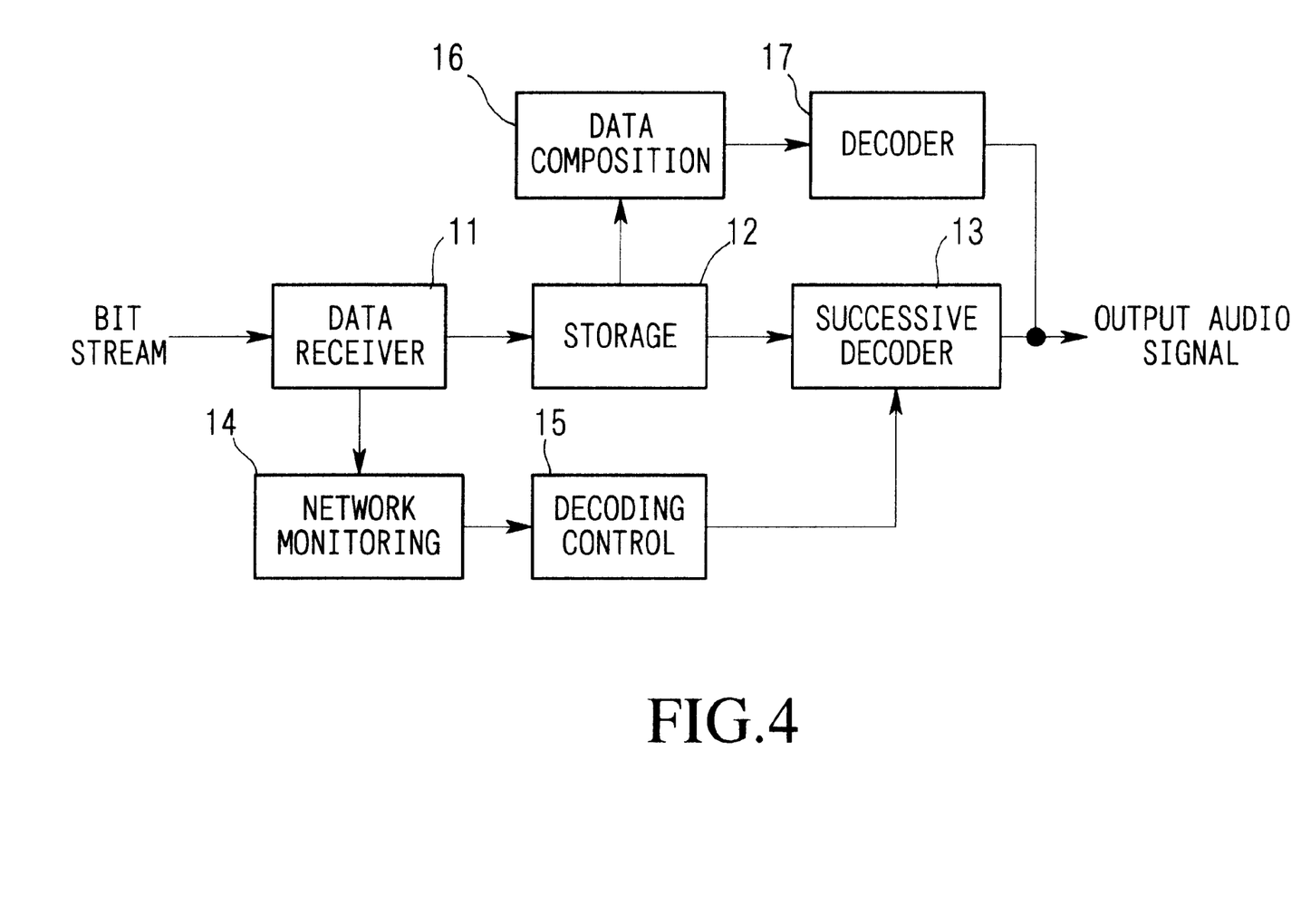
FIG. 4 is a block diagram showing an example of a configuration of a receiving station which copes with the audio encoding transmission system.

FIG. 4 is a block diagram showing an example of a configuration of a receiving station which is provided in response to the transmitting station of FIG. 1.

Bit streams output from the transmitting station are transmitted through the network (not shown) and are supplied to the receiving station. Herein, a data receiver section 11 receives the bit streams transmitted thereto. The bit streams are once stored in a storage unit 12 and are then supplied to a successive decoder 13. The successive decoder 13 firstly detects a header of the bit stream and then detects a boundary identifier of the bit stream. So, the successive decoder 13 recognizes a range of data between the header and boundary identifier of the bit stream as outline data. Upon recognition of the outline data, the successive decoder 13 starts "successive" decoding. Thus, it is possible to realize decoding in a real-time manner. Decoding of the outline data provides real-time reproduction of sounds whose sound quality is not so high but is sufficient for a brief audition which a listener gives.

In some case, the condition of the network indicates a high degree of congestion, so that real-time transmission is hard to be performed even if the bit rate is reduced considerably. In the receiving station of FIG. 4, a network monitoring section 14 monitors the condition of the network. So, the network monitoring section 14 supplies a result of monitoring to a decoding control section 15. The decoding control section 15 sets a wait time which is 1 minute, 2 minutes, . . . During the wait time, the decoding control section 15 controls the successive decoder 13 not to perform the successive decoding so that the receiving station merely performs receiving of data transmitted thereto. After the wait time elapses, the decoding control section 15 controls the successive decoder 15 to start a series of consecutive operations of the successive decoding. Thus, it is possible to perform the decoding substantially in a real-time manner without pauses (or breaks) in reproduction sounds.

Next, the receiving station receives the detail data to follow the outline data. At this time, the listener gives a brief audition to the reproduction sounds based on the outline data at the receiving station. So, the system as a whole can be constructed such that the listener is capable of making a request, based on a result of the audition, whether to wish further transmission of audio information which ensures the listener a higher sound quality. In that case, the transmitting station starts transmission of the detail data when receiving the request from the receiving station.

After completion of the transmission of the detail data, the storage unit 12 of the receiving station stores all the detail data. So, a data composition section 16 performs composition of the outline data and detail data. If the detail data are divided into multiple portions, the data composition section 16 performs composition of the outline data and multiple portions of the detail data. The data composition section 16 produces composite data, which are then subjected to decoding of a decoder 17. Thus, it is possible to reproduce audio signals with a high sound quality.

Next, a description will be given with respect to a concrete example of the scalable encoder 1.

Figure 5:
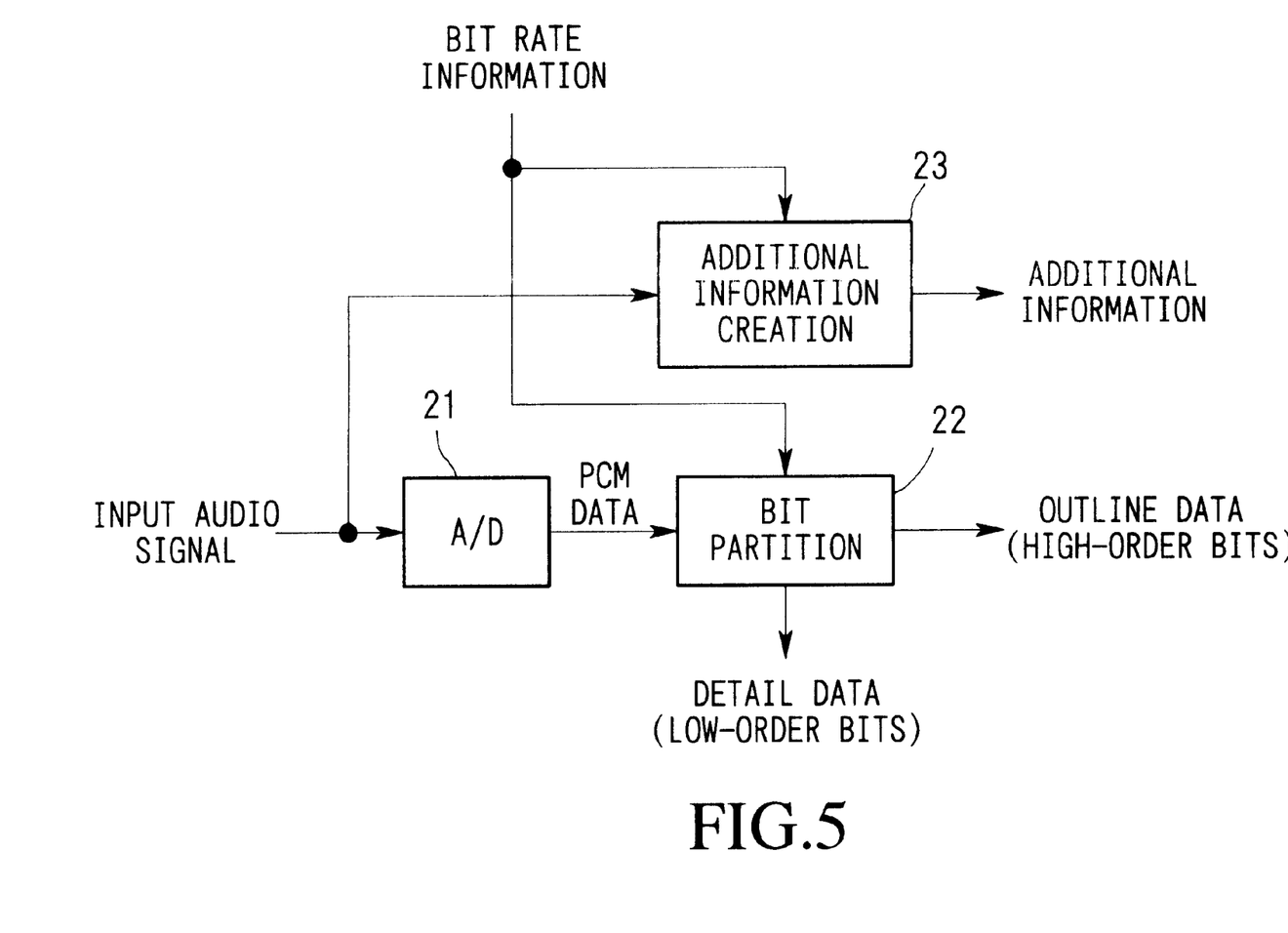
FIG. 5 is a block diagram showing an example of an internal configuration of a scalable encoder shown in FIG. 1 which deals with PCM data.

FIG. 5 shows an example of an internal configuration of the scalable encoder 1 which is designed to deal with PCM data (where 'PCM' is an abbreviation for 'Pulse Code Modulation'). Herein, bits of the PCM data are partitioned into two portions which correspond to high-order bits and low-order bits respectively. The outline data are placed as the high-order bits whilst the detail data are placed as the low-order bits.

Input audio signals are subjected to analog-to-digital conversion using a certain sampling frequency by an analog-to-digital converter (i.e., A/D converter) 21. Thus, the A/D converter 21 produces PCM data of 16 bits, for example. The PCM data are supplied to a bit partition section 22. Herein, 16 bits of the PCM data are partitioned into high-order 8 bits and low-order 8 bits. As described above, the high-order 8 bits correspond to the outline data whilst the low-order 8 bits correspond to the detail data. An additional information creation section 23 creates additional information such as a header and a boundary identifier. So, the additional information creation section 23 adds the header at a top position of the outline data while adding the boundary identifier to follow an end position of the outline data.

Figure 6A:
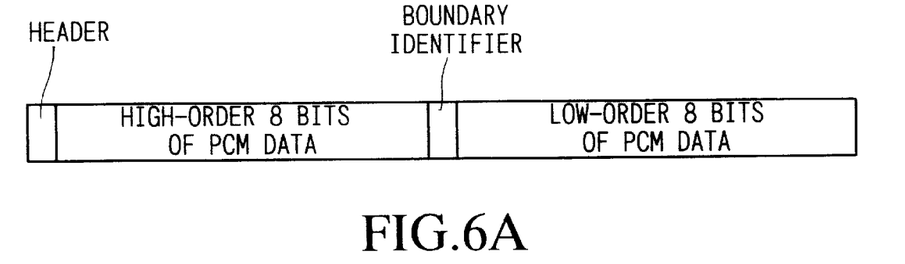
FIGS. 6A and 6B show formats of bit streams which are formed by the encoder of FIG. 5.

FIG. 6A shows a format of a bit stream of a fixed bit rate. Herein, elements of data are arranged in the bit stream in an order of a header, high-order 8 bits of the PCM data, boundary identifier and low-order 8 bits of the PCM data. Such a bit stream is transmitted from the transmitting station and is received by the receiving station. The receiving station performs analog-to-digital conversion on the high-order 8 bits of the PCM data so as to reproduce sounds in real time. In addition, if the low-order 8 bits of the PCM data are transmitted to the receiving station, the receiving station performs composition of the high-order 8 bits and low-order 8 bits with respect to a same frame. Thus, the receiving station regenerates the original PCM data of 16 bits. Then, the receiving station performs digital-to-analog conversion on the PCM data so as to reproduce sounds with a high sound quality. As described before, the high-order 8 bits of the PCM data act as the outline data. Herein, the bit rate of the outline data can be reduced to ½ of the bit rate which corresponds to full-bit transmission. For this reason, it is possible to transmit audio information of the outline data by the low-speed network in real time. By the way, a wait time is required to wait for completion of transmission of the detail data, which now correspond to the low-order 8 bits of the PCM data. Herein, the wait time required for transmission of the low-order 8 bits of the PCM data can be reduced to ½ of the wait time required for full-bit re-transmission of the detail data.

Figure 6B:
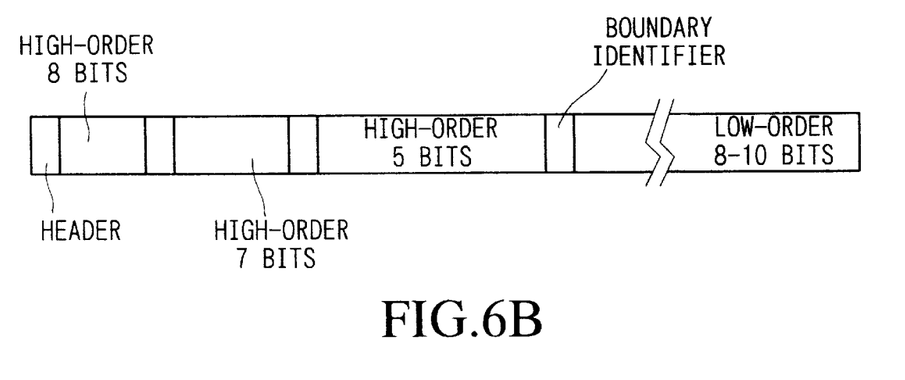

Next, in the case where the system changes the bit rate in response to the conditions of the network, the bit partition section 22 changes a number of high-order bits and a number of low-order bits in response to bit rate information. In addition, the additional information creation section 23 produces information representing a change of the bit rate. In this case, a format of a bit stream is modified as shown in FIG. 6B wherein the PCM data as a whole consist of 16 bits. Herein, a manner of transmission is modified with respect to the outline data which correspond to the high-order bits of the PCM data. A first portion of the bit stream following the header corresponds to high-order bits whose number of bits is fixed at '8'. Data (e.g., bit) representing an occurrence of change of the bit rate is inserted at a boundary of the first portion of the bit stream. Herein, the data is set at '0' when the bit rate is not changed, whilst the data is set at '1' when the bit rate is changed. In addition, if the data of '1' is inserted, 2 bits following the data of '1' are used as information representing an amount of change of the bit rate. The 2 bits are represented by binary codes of "00", "01", "10", and "11", as follows:

00→increase of 1 bit
01→increase of 2 bits
10→decrease of 1 bit
11→decrease of 2 bits Using the above information, it is possible to designate a number of bits which is increased or decreased.

Figure 7:
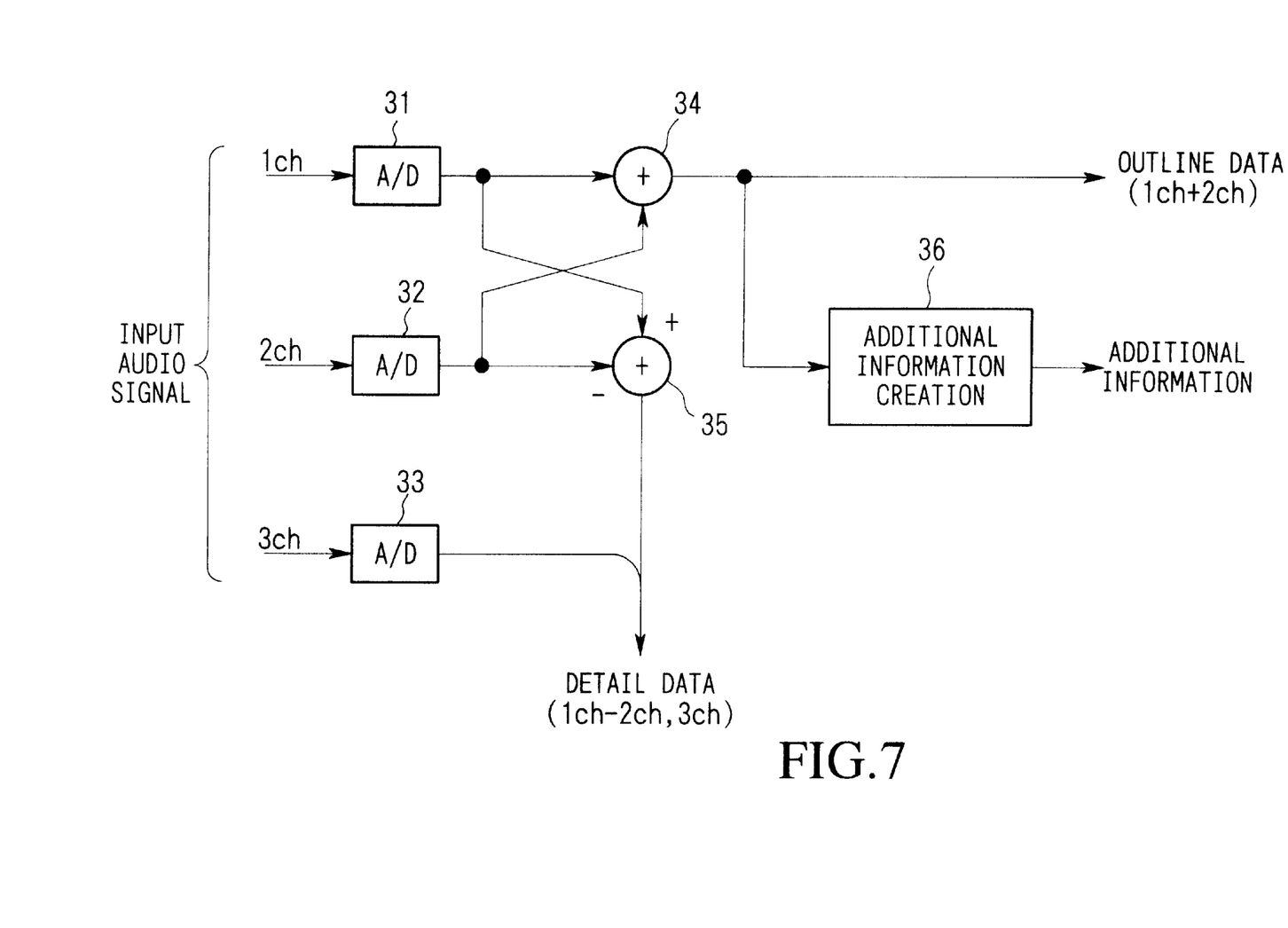
FIG. 7 is a block diagram showing an example of an internal configuration of the scalable encoder which deals with musical tone signals of multiple channels.

FIG. 7 shows an example of an internal configuration of the scalable encoder 1 which deals with audio signals of multiple channels. Herein, the audio signal of one channel is used as outline data whilst the audio signals of other channels are used as detail data.

Figure 8:
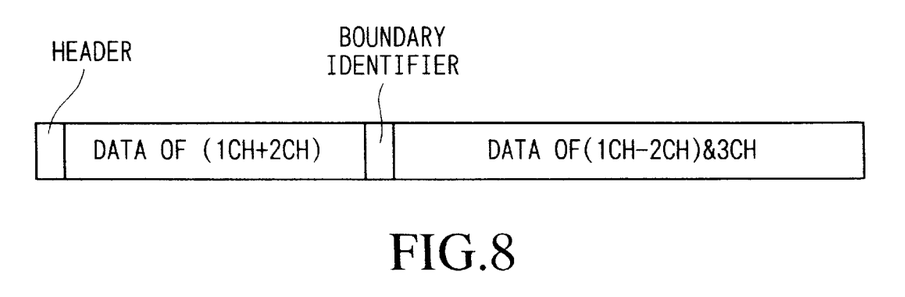
FIG. 8 shows a format of a bit stream constructed by the scalable encoder of FIG. 7.

Concretely, the scalable encoder 1 of FIG. 7 is designed to deal with audio signals of three channels which are represented by channel 1 (1ch), channel 2 (2ch) and channel 3 (3ch). The audio signals of channel 1 and channel 2 are stereo signals of left and right channels, while the audio signal of channel 3 is a super woofer signal, for example. Those audio signals are subjected to analog-to-digital conversion by A/D converters 31, 32 and 33 respectively. So, the A/D converter 31 produces digital data of channel 1; the A/D converter 32 produces digital data of channel 2; and the A/D converter 33 produces digital data of channel 3. An adder 34 adds the digital data of channel 1 and channel 2 together to produce a monaural signal, which is output as outline data. A subtractor 35 subtracts the digital data of channel 2 from the digital data of channel 1 to produce a difference signal (1ch−2ch). The difference signal coupled with the digital data of channel 3 are provided as detail data. The additional data creation section 36 outputs a header in response to a top position of the monaural signal while outputting a boundary identifier in response to an end position of the monaural signal. Thus, it is possible to produce a bit stream as shown in FIG. 8. The bit stream is constructed by arranging elements of data in an order of the header, data of (1ch+2ch) (i.e., outline data), boundary identifier, data of (1ch−2ch) plus data of 3ch (i.e., detail data).

Figure 9:
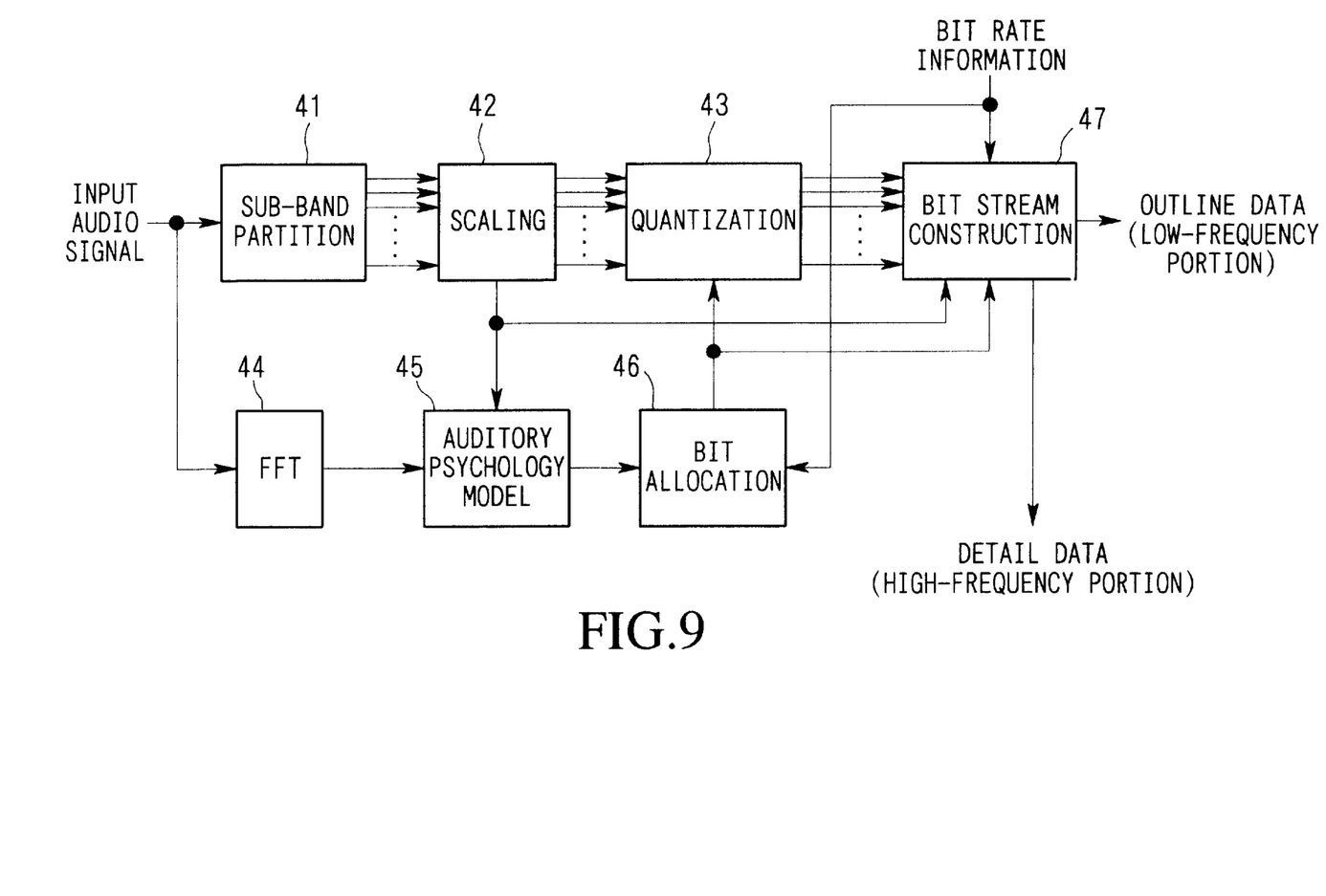
FIG. 9 is a block diagram showing an example of an internal configuration of the scalable encoder applicable to the MPEG-Audio system.

FIG. 9 is a block diagram showing an example of the scalable encoder 1 applicable to the so-called MPEG-Audio system (where 'MPEG' is an abbreviation for 'Moving Picture Expert Group' which copes with the ISO standard).

Figure 10A:
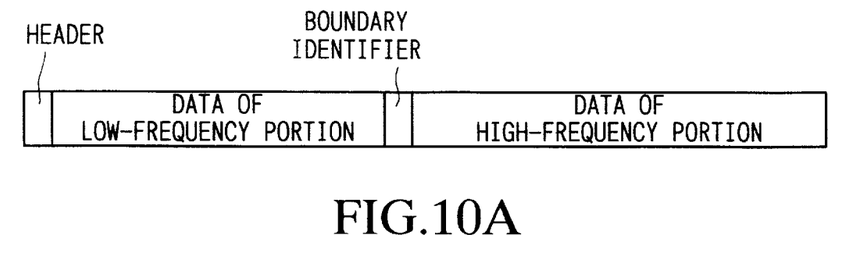
FIGS. 10A and 10B show formats of bit streams which are constructed by the scalable encoder of FIG. 9.
Figure 10B:
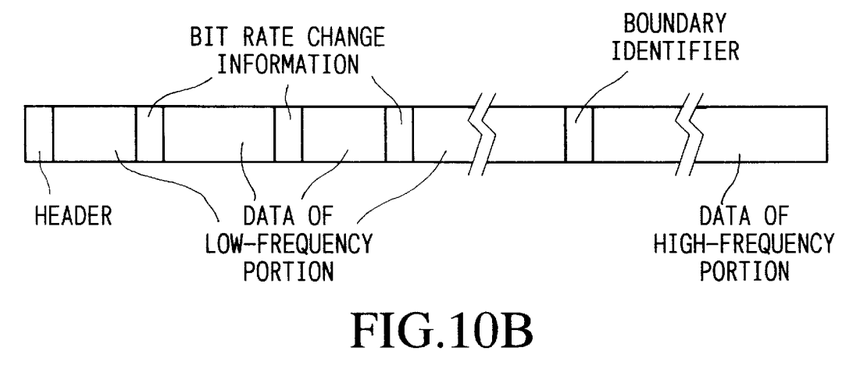

Input audio signals are supplied to a sub-band partition section 41 in which frequency components thereof are partitioned to 32 frequency bands. So, sub-sampling is performed on the input audio signals with respect to each of the frequency bands. Thus, each frequency band corresponds to data of 12 samples or so. The data are supplied to a scaling section 42 in which they are separated into a normalized waveform and a factor of multiplication. Outputs of the scaling section 42 are forwarded to a quantization section 43. On the other hand, the input audio signals are supplied to a FFT section 44 as well. So, the input audio signals are subjected to processes of FFT (where 'FFT' is an abbreviation for 'Fast Fourier Transform'). Thus, it is possible to produce audio spectrum. An auditory psychology model 45 is activated based on the audio spectrum as well as the waveform and factor of multiplication which are produced by the scaling section 42 with respect to each of the frequency bands. Herein, the auditory psychology model 45 operates in consideration of a masking effect as well. A bit allocation section 46 performs allocation of bits in response to the auditory psychology model 45. The quantization section 43 performs quantization on the waveform and factor of multiplication in response to the allocation of bits. A bit stream construction section 47 constructs bit streams on the basis of outputs of the quantization section 43 and outputs of the bit allocation section 46. Herein, low-frequency data corresponding to low-frequency components are provided as outline data, whilst high-frequency data corresponding to high-frequency components are provided as detail data. Based on bit rate information, the bit allocation section 46 and the bit stream construction section 47 determine a bit rate which is designated for the low-frequency data. FIG. 10A shows an example of a format of a bit stream which is constructed by the bit stream construction section 47 and in which some elements of data are sequentially arranged in an order of a header, low-frequency data, a boundary identifier and high-frequency data. In case of the variable bit rate, the format of the bit stream is changed as shown in FIG. 10B. Herein, information representing a change of the bit rate is inserted into the low-frequency data following the header at a position which is just before an occurrence of a change of the bit rate.

Figure 11:
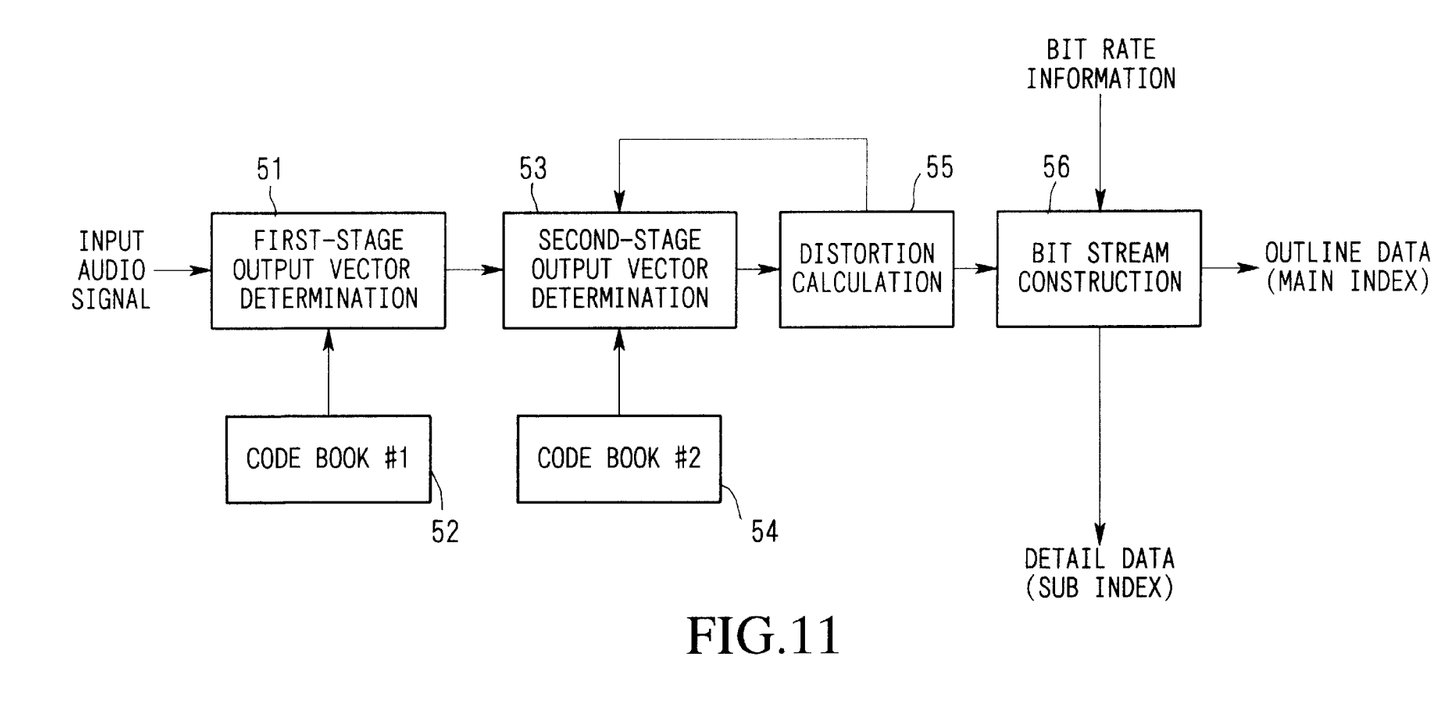
FIG. 11 is a block diagram showing an example of an internal configuration of the scalable encoder applicable to multi-stage vector quantization.

FIG. 11 is a block diagram showing an example of an internal configuration of the scalable encoder 1 applicable to multi-stage vector quantization.

A target vector can be formed by using input audio signals or data which is produced by performing orthogonal transformation such as MDCT (abbreviation for 'Modified Discrete Cosine Transform') on input audio signals. A first-stage output vector determination section 51 selects a first vector, which is optimum to the target vector, on the basis of content of a first code book 52. Next, a second-stage output vector determination section 53 selects a second vector (i.e., sub-vector) on the basis of content of a second code book 54 to match with the first vector. Herein, the second vector is determined in such a way that a combination of the first and second vectors approaches the target vector as close as possible. Selection of the second vector is made based on a result of distortion calculation which is made by sub-vector distortion calculation section 55. As a result, a main index is selected from the first code book 52 while a sub index is selected from the second code book 54. A bit stream construction section 56 performs a composition of the main index and sub index to produce a bit stream based on bit rate information. In this case, it is possible to reproduce sounds with a certain sound quality by using the main index only. For this reason, it is possible to use the main index as outline data while using the sub index as detail data.

Figure 12:
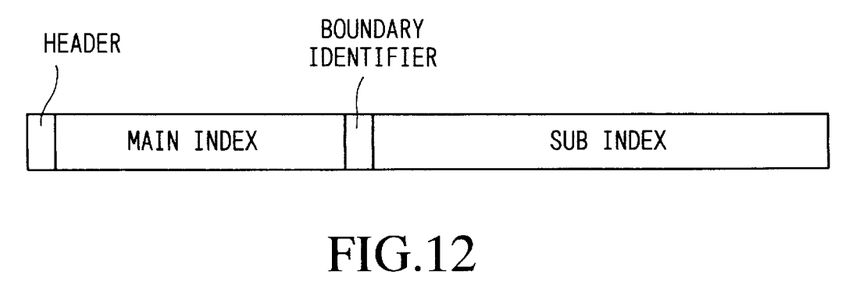
FIG. 12 shows a format of a bit stream constructed by the scalable encoder of FIG. 11.

In case of the fixed bit rate, the bit stream produced by the bit stream construction section 56 may have a format shown in FIG. 12. So, elements of the bit stream are sequentially transmitted in an order of the header information, main index (which acts as the outline data), boundary identifier and sub index (which acts as the detail data). In case of the variable bit rate which is variable in response to the condition of the network, the system thins out some elements of the main index; and the detail data are formed using the sub index in addition to the main index, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An audio encoding transmission system in which a transmitting station transmits audio signals in an encoded form onto a transmission line so that a receiving station receives, decodes and reproduces the audio signals, the audio encoding transmission system employing a method comprising the steps of:

partitioning an encoded output corresponding to a result of an encoding process which the transmitting station performs on the audio signals into outline data having a low bit rate by which the audio signals can be successively reproduced and detail data which are combined with the outline data to provide a high sound quality in reproduction of the audio signals;

transmitting the outline data prior to transmission of the detail data;

then transmitting the detail data;

performing successive reproduction of the audio signals by performing successive decoding of the outline data at the receiving station without waiting for the transmission of the detail data; and if both of the outline data and the detail data are completely transmitted to the receiving station, performing composition of the outline data and the detail data to provide high-quality reproduction of the audio signals.

2. An audio encoding transmission system in which a transmitting station transmits audio signals in an encoded form onto a transmission line so that a receiving station receives, decodes and reproduces the audio signals, the audio encoding transmission system employing a method comprising the steps of:

partitioning an encoded output corresponding to a result of an encoding process which the transmitting station performs on the audio signals into outline data having a low bit rate by which the audio signals can be successively reproduced and detail data which are combined with the outline data to provide a high sound quality in reproduction of the audio signals;

controlling a bit rate of the outline data in response to a condition of the transmission line at the transmitting station;

transmitting the outline data prior to transmission of the detail data;

then transmitting the detail data;

performing successive reproduction of the audio signals by performing successive decoding of the outline data at the receiving station without waiting for the transmission of the detail data; and if both of the outline data and the detail data are completely transmitted to the receiving station, performing composition of the outline data and the detail data to provide high-quality reproduction of the audio signals.

3. An audio encoding transmission system according to claim 1 wherein the transmitting station performs an analog-to-digital conversion on the audio signals to produce PCM data of n bits (where n is an integer which is equal to 2 or more), the PCM data being partitioned into a high-order portion of m bits (where m is less than n) which is used as the outline data and a low-order portion of (n−m) bits which is used as the detail data, whereas the receiving station performs the successive reproduction of the audio signals on the basis of the high-order portion of the PCM data, and the receiving station performs a composition of the high-order portion and low-order portion of the PCM data to produce composite data based on which the receiving station performs the high-quality reproduction of the audio signals.

4. An audio encoding transmission system according to claim 1 wherein the transmitting station forms the outline data by using a monaural signal which is produced by adding audio signals of multiple channels which are used to provide stereo sounds while forming the detail data by using a difference signal representing a difference between the audio signals of the multiple channels, whereas the receiving station performs successive reproduction of the audio signals on the basis of the monaural signal, and the receiving station performs reproduction of the stereo sounds on the basis of the monaural signal and the difference signal.

5. An audio encoding transmission system according to claim 1 wherein the transmitting station uses low-frequency components of the audio signals as the outline data while using high-frequency components of the audio signals as the detail data, whereas the receiving station performs the successive reproduction of the audio signals on the basis of the low-frequency components of the audio signals, and the receiving station performs the high-quality reproduction of the audio signals on the basis of the low-frequency components and the high-frequency components of the audio signals.

6. An audio encoding transmission system according to claim 1 wherein the transmitting station provides first and second code books to execute two-stage vector quantization processes in such a way that the transmitting station performs selection of vectors in the first code book to select an vector which is optimum to a target vector based on the audio signals while performing selection of sub-vectors in the second code book to select a sub-vector which provides a closest approach to the target vector when being combined with the vector selected from the first code book, so that an index corresponding to the vector selected from the first code book is used as the outline data while an index corresponding to the sub-vector selected from the second code book is used as the detail data, whereas the receiving station performs the successive reproduction of the audio signals on the basis of the index of the vector selected from the first code book, and the receiving station performs the high-quality reproduction of the audio signals on the basis of the index of the vector selected from the first code book as well as the index of the sub-vector selected from the second code book.

7. An audio encoding transmission system according to claim 1 wherein the transmitting station starts transmission of the detail data to the receiving station when receiving a request of transmission given from the receiving station.

8. An audio encoding transmission system comprising:

bit rate information providing means for providing bit rate information representing a bit rate which is variable in response to a condition of a network;

analog-to-digital converter means for converting audio signals input thereto to audio data;

partitioning means for partitioning the audio data into outline data and detail data in response to the bit rate information, wherein a low bit rate is set to the outline data;

additional information creating means for creating additional information on the basis of the audio signals and the bit rate information;

bit stream constructing means for constructing a bit stream by arranging the outline data, the detail data and the additional information; and transmitting means for transmitting the bit stream onto the network in such a way that the outline data are transmitted firstly with the low bit rate in a real-time manner.

9. An audio encoding transmission system according to claim 8 wherein the transmitting means firstly transmits the outline data with the low bit rate in a real-time manner; then, the transmitting station transmits the detail data in response to a request of transmission given thereto.

10. An audio encoding transmission system according to claim 8 wherein a content of the outline data changes in response to a variation of the bit rate.

11. An audio encoding transmission system according to claim 8 wherein the outline data correspond to low-frequency components of the audio signals while the detail data correspond to high-frequency components of the audio signals.

12. An audio encoding transmission system comprising:

a transmitting station for transmitting a bit stream onto a transmission line in response to bit rate information representing a bit rate which is variable in response to a condition of the transmission line, wherein the bit stream is constructed based on outline data and detail data which are produced by performing an encoding process on audio signals input thereto in such a way that the outline data and the detail data correspond to different frequency components of the audio signals respectively, so that the outline data are transmitted firstly with a low bit rate in a real-time manner; and a receiving station for performing successive decoding of the outline data to provide successive reproduction of the audio signals in a real-time manner, the receiving station being capable of performing decoding of the outline data and the detail data to provide high-quality reproduction of the audio signals.

13. An audio encoding transmission system according to claim 12 wherein a content of the outline data changes in response to a variation of the bit rate which follows a variation of the condition of the transmission line.

14. An audio encoding transmission system according to claim 12 wherein the decoding of the outline data and the detail data is started after the receiving station waits for completion in transmission of both of the outline data and the detail data.

15. An audio encoding transmission system according to claim 12 wherein the transmitting station firstly transmits the outline data with the low bit rate to the receiving station in a real-time manner; then, the transmitting station transmits the detail data in response to a request of transmission given from the receiving station.

16. An audio encoding transmission system according to claim 8 wherein the audio signals correspond to musical tone signals.

* * * * *